United States Patent [19]

Dugan

[11] Patent Number: 4,846,854

[45] Date of Patent: Jul. 11, 1989

[54] SYSTEM FOR VENTING GAS FROM A LIQUID STORAGE TANK

[75] Inventor: Regina E. Dugan, Pasadena, Calif.

[73] Assignee: The United States of America as represented by the United States National Aeronautics and Space Administration, Washington, D.C.

[21] Appl. No.: 251,439

[22] Filed: Sep. 30, 1988

[51] Int. Cl.[4] .............................................. B01D 47/00
[52] U.S. Cl. ....................................... 55/46; 55/159; 137/154; 141/93; 239/543
[58] Field of Search ................... 55/46, 55, 159, 194; 239/543, 558, 124; 137/154; 141/44, 52, 53, 93

[56] References Cited

U.S. PATENT DOCUMENTS

| | | | |
|---|---|---|---|
| 2,006,985 | 7/1935 | Claude et al. | 55/55 |
| 3,486,302 | 6/1966 | Paynter | 55/159 |
| 3,565,345 | 2/1971 | Moltzan | 239/543 |
| 3,933,448 | 1/1976 | Di Peri | 55/159 |
| 4,272,257 | 6/1981 | Ellion et al. | 55/38 |
| 4,768,541 | 9/1988 | Uney et al. | 137/154 |

FOREIGN PATENT DOCUMENTS 870259 10/1981 U.S.S.R. .............. 137/154

Primary Examiner—Bernard Nozick

Attorney, Agent, or Firm—Edward K. Fein; John R. Manning; Russell E. Schlorff

[57] ABSTRACT

Gas is vented from a non-cryogenic liquid storage tank 12 while discharging pressurized liquid from a tube 18 into the tank through a plurality of inclined jets 54, 56 circumferentially spaced about an end of a vent tube 20 positioned within the tube 18. Each jet is directed toward a central axis 72 of the vent tube, such that the end of vent tube receives gas from the vessel passing between individual jetstreams, which in combination form a conical-shaped barrier to liquid droplets which would otherwise also pass to the vent tube and out the tank 12. Gas is thus vented through the central tube while pressurized liquid flows in an axially opposite direction in the annulus between inner vent tube 20 and the outer liquid tube 18. The system of the present invention is particularly well suited for venting gas from a tank being replenished with liquid at a zero or near zero gravity environment. A screen-type liquid acquisition device 14 employing surface tension is provided for withdrawing substantially liquid from the tank. The withdrawn liquid may be re-supplied to the liquid tube under pressure supplied by circulating pump 24, thereby releasing substantially only gas from the storage tank 12 to reduce pressure in the tank.

20 Claims, 1 Drawing Sheet

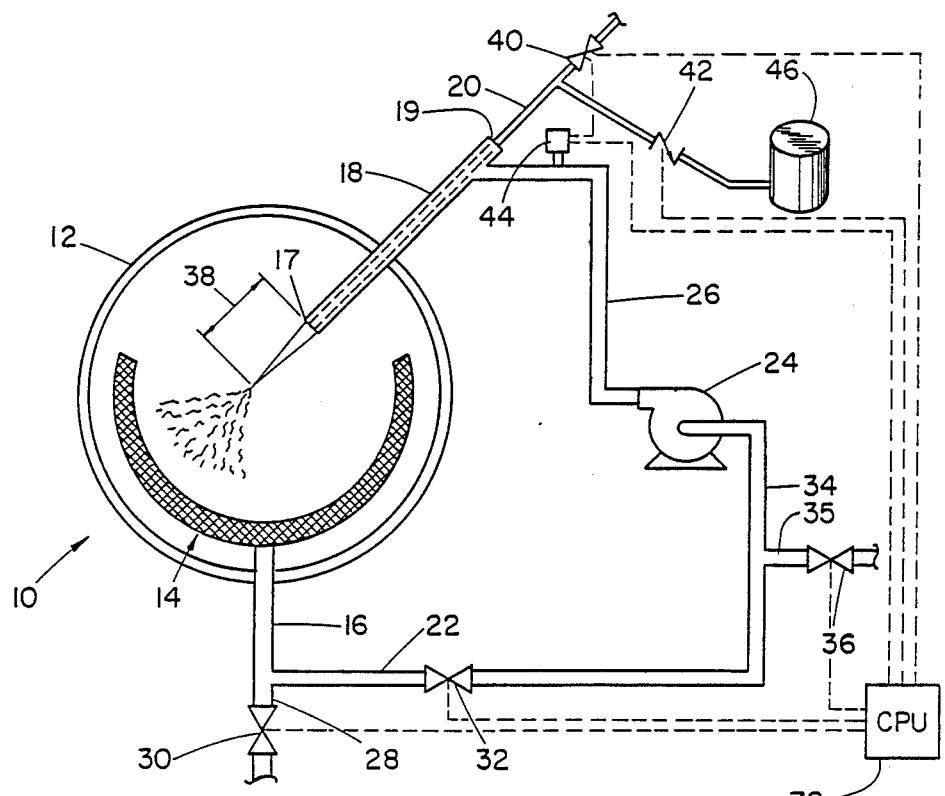

SYSTEM FOR VENTING GAS FROM A LIQUID STORAGE TANK

ORIGIN OF THE INVENTION

The invention described herein was made by an employee of the United States Government and may be manufactured and used by or for the Government of the United States of America for governmental purposes without the payment of any royalties thereon or therefore.

TECHNICAL FIELD

The invention relates to methods and apparatus for separating liquid and gas (vapor) and, more particularly, to improved methods and apparatus for venting ullage gas from a liquid storage tank being replenished with a non-cryogenic liquid while in a zero or near-zero gravity environment.

BACKGROUND ART

Those familiar with the storage of fluids have long recognized that significant problems arise when attempting to separate a non-cryogenic liquid from a gas (vapor) in a storage vessel in a low-gravity environment. At a zero or near zero gravity, the difference in specific gravity between the liquid and the gas becomes of less consequence in determining the position of the liquid and the gas (vapor) within the vessel, i.e., a conventional gravity orienting force is not present. Accordingly, a conventional bottom liquid drain port and an upper gas/vapor vent port cannot achieve the desired separate flow of liquid and gas/vapor, respectively, from these ports.

The problem associated with zero gravity liquid/gas separation arises during space travel and, particularly, for constant velocity, non-spinning orbiting vehicles and space craft. While this problem does not arise for "blowdown" systems wherein gas is not added to the storage tank as liquid is removed, some systems preferentially add gas to the tank, e.g., to expel liquid from the tank. For example, during re-supply of a non-cryogenic liquid to a storage tank of an in-orbit space craft having a liquid in physical contact with a gas, gas must be vented from the vessel as liquid is added to prevent a pressure increase in the vessel which might otherwise rupture the light-weight vessel. If the space craft is in a constant velocity, non-spinning mode, neither acceleration nor centrifugal forces are available for liquid/gas separation. The venting of typical non-cryogenic liquids used in space travel, such as liquid fuel, with the gas must be avoided both to prevent the loss of fuel transported to the space craft at a high cost, and to minimize safety risks and space craft equipment deterioration or malfunction problems which might occur if the liquid were released to the environment.

The prior art has devised suitable equipment for achieving the withdrawal of liquid from a zero gravity storage tank containing both liquid and gas. U.S. Pat. No. 3,486,302 to Paynter discloses a system for recovering liquid from a storage vessel at zero or reduced gravity. A closed-volume woven wire mesh within the vessel is used to collect liquid by adhesion and cohesion forces, so that only liquid is passed from the mesh through an outlet in the vessel. A vapor outlet is provided in fluid communication with the volume between the tank and the interior closed-volume mesh, with gas passage through the outlet being responsive to pressure within the vessel. U.S. Pat. No. 3,933,488 to De Peri discloses a gas separator system which also employs a mesh screen in a vessel as a surface tension device to collect liquid and isolate the gas from the liquid. The mesh screen is collapsible as liquid is removed from the vessel at zero gravity. A charge opening is provided for inputting pressurized gas to the vessel. U.S. Pat. No. 4,272,257 to Ellion et al employs a liquid surface tension device of a different construction for use within a zero gravity liquid storage vessel. The device utilizes etched flow passageways which pass only liquid by surface tension effects, with gas being prevented from moving through the passageways. Tubular galleries are positioned within the tank so that liquid in preference to gas is delivered to the galleries. A vent line vents gas from the tank during the land-based liquid filling operation, and serves to supply pressurized gas to the tank.

While the prior art has devised systems for withdrawing liquid rather than a liquid/gas mixture from a storage tank at zero gravity, it has not provided equipment or techniques for effectively removing gas rather than a liquid/gas mixture from the storage tank at zero or near zero gravity. Similarly, prior art techniques have provided vent tubes for venting gas from a liquid storage tank at zero gravity, but such techniques are both complex and/or do not effectively prevent the discharge of liquid.

The disadvantages of the prior art are, however, overcome by the present invention, and simple yet reliable techniques are hereinafter disclosed for withdrawing substantially only gas from a liquid storage tank in a zero or near zero gravity environment. The techniques of the present invention allow the re-supplying of a non-cryogenic liquid to the tank in a zero gravity environment while venting only substantially gas from the tank to prevent an increase of pressure.

SUMMARY OF THE INVENTION

A suitable embodiment of the invention includes a liquid storage vessel or tank having a fluid inlet and a fluid outlet, a surface tension or other suitable device within the vessel for collecting liquid and supplying substantially only liquid to the liquid outlet, and a combination liquid inlet/gas vent device for inputting a non-cryogenic liquid to the tank and for venting substantially only gas or vapor from the tank. An outer liquid tube and an axially aligned inner gas tube are provided, with pressurized liquid input to the tank through the annulus between the tubes. Thereafter, the liquid passes through a plurality of circumferentially spaced jets at the end of the tubes each radially directed toward the axis of the vent tube. The discharge of liquid through the jets produces a conical-shaped barrier having its base adjacent the end of the vent tube and its apex along the axis of the vent tube. This barrier permits gas to pass from the tank into the vent tube and out of the tank to reduce pressure, while preventing liquid droplets of a selected size from passing between the jet-streams and to the vent tube.

Accordingly, it is an object of the invention to provide a simple yet reliable system for removing substantially only gas from a vessel containing both gas and liquid in a zero or near zero gravity environment. Another feature of the invention is that the system is light weight and have few moving parts, so that the system can be practically employed for use with space vehicles having liquid storage tanks.

Finally, an advantage of the invention is that the system can be readily adapted for releasing substantially only gas from a conventional liquid storage tank in a zero or near zero gravity environment, with the tank optionally including a surface tension device to pass substantially only liquid through a liquid outlet from the tank.

These and further objects, features and advantages of the present invention will become apparent from the following detailed description, where reference is made to the figures in the accompanying drawings.

BRIEF DESCRIPTION OF THE DRAWINGS

FIG. 1 is a simplified pictorial view of a liquid storage tank including apparatus according to the present invention for venting gas from the tank.

FIG. 2 is an end view of the combination liquid input/gas vent tube shown in FIG. 1.

FIG. 3 is a partial cross-sectional view of the tube shown in FIG. 2.

DETAILED DESCRIPTION OF THE INVENTION

The present invention may be understood in the context of either removing gas from a fuel storage tank of a space craft during a re-fueling operation, or removing gas from the tank in order to reduce the undesirable buildup of pressure in the tank caused, for example, by solar heating. In any event, the present invention achieves the release of substantially only gas from the tank, so that very little liquid in the fuel tank is lost to the environment during the venting process. In a typical application, the fuel tank would be partially or totally filled with fuel prior to liftoff of the space craft, and the space craft is in a constant velocity, non-spinning mode when it is desirable to either re-supply fuel to the tank or to vent excess pressure from the tank.

Referring now to FIG. 1, the system 10 of the present invention includes a conventional storage tank which houses a non-cryogenic liquid, such as rocket fuel. Tank 12 may be of any desirable configuration, such as a cylindrical or spherical shape, and may be insulated and/or shielded for minimizing radiant heating. By closing off the flow lines through the walls of the tank, tank 12 may be substantially sealed from the environment.

A suitable embodiment of the present invention may include a liquid acquisition device 14 for accumulating substantially liquid at a location in the tank, so that liquid only with little or no vapor or gas may be discharged from the tank through line 16. During normal use of the space craft, it should be understood that tank 12 and collection device 14 supply liquid fuel, as needed, to rockets or other consumption devices via line 16, with a valve 30 then being opened and valve 32 closed. Device 14 may be of the type described in the previously referenced patents, with a design as disclosing U.S. Pat. No. 4,272,257 being typical. In particular, it is not critical according to the present invention that the collection device 14 be either self-enclosing or collapsible, since the collection device need not assure a liquid location within the vessel or tank.

The invention also includes a combined liquid input tube and a gas vent tube device. Liquid tube 18 receives liquid from line 26 and passes through a liquid input port in the tank for discharging liquid into the tank from end 17. End 19 of tube 18 is sealingly closed about tube 20. Tube 20 has a portion of its length positioned radially within the tube 18, and has an inlet opening end within the tank and an outlet opening end outside the tank. The tubes 18, 20 may each be fabricated from rigid tubular material, such as aluminum, magnesium, or a high strength ceramic suitable for use in outer space. The axis of the tubes 18, 20 are preferably aligned, so that a uniform annulus is formed about the inlet opening of the vent tube 20.

Referring now to FIGS. 2 and 3, the discharge end 17 of liquid input tube 18 is substantially but not fully closed, and has a plurality of holes or jets 54, 56 for discharging liquid in jetstreams into the tank. Liquid flows into the tank through annulus 50 between tubes 18, 20, while gas is flowing axially in the opposite direction from the tank 12 through the passageway 52 in the vent tube 20.

The holes or jets 54, 56 may be formed by a drilling operation, and thus may each have a generally cylindrical configuration. In a suitable embodiment, the vent tube 20 has an interior diameter of approximately 1.2 cm, and each of the jets 54, 56 has a diameter of approximately 2 mm. The jets 56 are arranged in a circular configuration with diameter 64 of approximately 1.9 cm. The jets 54 are similarly arranged in a circular configuration having a diameter 62 of approximately 2.8 cm. Each of the circular configurations 62, 64 is preferably aligned with the central axis 42 of the vent tube 20, which is also the central axis of the tube 18.

As shown in FIG. 2, the jets 56 are separated by a centerline spacing 74. The diameter of each jet 56 is preferably at least $\frac{1}{3}$ of the centerline spacing between adjacent jets, so that a relatively thin gap exists between any length of the jetstreams from adjacent jets. The spacing 74 is determined as a function of the allowable liquid droplet size permitted to pass from the vessel 12 during the venting operation. In other words, if the allowable size of liquid droplets decreases, the number of jets should be increased, either by decreasing the spacing between the jets or by increasing the number of expanding circular configurations (described subsequently) for the jets. While it may be desirable that absolutely no liquid be vented from the vessel 12, manufacturing costs and/or potential plugging problems may practically result in allowing a very limited discharge of liquid droplets (fine mist) from the vessel with the vented gas. If desired, the remaining liquid could be spun out using a centrifugal spinner, which is much more energy efficient and presents fewer operational problems than spinning an entire vessel. Nevertheless, substantially only gas rather than a liquid/gas mixture with a substantial quantity of liquid is vented from the vessel at zero or near zero gravity according to the the present invention.

It may be seen in FIG. 2 that each of the jets 54 is offset with respect to the angle of the radially inward jets 56. The angle 68 between adjacent jets 56 may, for example, be 15°, and the same angle 66 may be provided between adjacent jets 54. A particular jet in one circular configuration is, however, offset from the radially spaced jets in the other configuration by an angle 70 of, for example, $7\frac{1}{2}$°. Thus, gas must flow in a non-linear or arcuate path between jetstreams to enter the vent tube 20. This design will, of course, substantially decrease the size of droplets which are allowed to enter the tube 20 compared to a design with only one circular configuration of jets, since the momentum of many liquid droplets passing between jetstreams from adjacent jets 54 will carry the droplets into a jetstream formed by one of the jets 56. The "captured" droplet will be expelled toward the interior of the vessel 12 rather than continuing to pass with the gas through to the vent tube 20. Also, additional "rows" of jets may be provided in ever-expanding circular configurations, each preferably aligned with the axis 42.

Each of the holes or jets 54, 56 is positioned such that the issuing jetstream will be directed toward the central axis of the vent tube and intersect other jetstreams. Thus, a conical-shaped barrier of jetstreams is provided. As shown in FIGS. 2 and 3, each jet has an axis directed to substantially intersect the central axis 42 of the vent tube 20. The inclined angle 60 of jets 56 may be slightly less than inclined angle 58 of jets 54, so that the jetstreams from all jets 54, 56 meet at substantially the same apex point along the axis 42, thereby forming two conical-shaped liquid barriers. Each of the liquid barriers formed by the jetstreams 54, 56 would have a circular base at the inlet opening of the vent tube 20 and spaced radially outward therefrom, and having the same apex aligned with the axis 42 of the vent tube. As an example, for the embodiment previously described, each of the jets 56 may be inclined at an angle of approximately 4° from the axis 42, while each of the jets 54 is inclined at a slightly greater angle of approximately 6°, so that the conical-shaped barriers meet at substantially the same apex.

The discharge end 17 of a tube 18 may also be provided with one or more sharp-edge flow obstructions 21. The annular obstructions 21 minimizes wicking of liquid (caused by surface tension effects) down the outside of the tube 18 toward the inlet opening of the vent tube 20. Also, flow of liquid from the surface of the tube 18 into the tube 20 may be minimized by providing a non-wetting exterior surface, such as that formed by a teflon material, between the obstructions 21 and the inlet opening of the tube 20.

When it is desirable to re-supply liquid fuel to the tank 12 in a zero or near zero gravity environment, valves 30 and 32 may be closed and valve 36 in supply line 35 opened. Pressurized fluid will then be passed through line 26 and to the annulus between tubes 18, 20. Sensor 44 may be used to detect the flow of liquid (or liquid pressure) in line 26 or tube 18, and may in response generate a liquid flow signal which automatically opens valve 40 in vent line 20. It may be desirable to form the conical liquid jetstreams, allow the system to stabilize for several seconds, then open valve 40 to allow substantially only gas to be vented from the vessel 12. In this manner, system transients caused by start-up would not affect the vent efficiency.

Before opening the valve 40 to vent gas from tube 12, it may also be desirable to "blow out" vent tube 20, which may contain has a liquid/gas mixture therein. With valve 40 closed, a signal from the central processing unit 72 may be used to briefly open check valve 42, e.g., for five seconds, to allow high pressure gas in tank 46 to clear the vent tube 20. Alternatively, a pump could be used to pull low pressure gas from a source (not shown) and briefly provide a high presuure gas to vent tube 20 to accomplish this blowout operation. This "blowout" operation may occur immediately prior to opening valve 36, or may occur in the time frame between the opening of valve 36 and the opening of valve 40. The central processing unit 72 may receive signals from each of the valves shown in FIG. 1, and may control opening and closing of all valves in a conventional manner.

The present invention may also be used to relieve an undesirable buildup of pressure in tank 12 caused, for example, by solar heating. To achieve venting of gas from a tank 12 when liquid is not being re-supplied to the tank, valves 30 and 36 may be closed and valve 32 open. The central processing unit 72 may then activate pump 24, which draws fluid through lines 22, 34, and discharges liquid under pressure through line 26 to the tube 18. Thus the pump 24 causes the flow of substantially only liquid in a closed loop between the liquid discharge port of the tank and the liquid inlet port of the tank. With pump 24 supplying liquid under pressure to the discharge end 17 of the tube 18 to form the desired concial-shaped liquid barriers formed by the jetstreams, the valve 40 may then be opened to vent substantially only gas from the vessel 12.

As shown in FIG. 1, the plurality of conical-shaped jetstreams meet at an apex distance 38 from the end 17 of the tube 18. The axes of the holes or jets 54, 56 are preferably inclined so that the jetstreams retain sufficient velocity throughout their length 38 to prevent liquid from entering the inlet of tube 20. The conical-shaped barrier formed by the liquid jetstreams could form an apex spaced from axis 42, however, such a design does not seem to offer any advantage, and thus the design described earlier is preferred. Also, the apex formed by the conical-shaped liquid barriers is preferably near the center of the tank 12, as shown in FIG. 1, since experience has shown gas most often near the tank center.

It should be understood that the vent tube and liquid input tube need not be axially aligned along their entire length between the receiving end 19 and the discharge end 17 of the tube 18. In other words, tube 18 could pass through the tank wall at a location other than the liquid input port, and the two tubes could then come together within the tank to form an annulus 50 therebetween at least adjacent the end 19 of the tube 18. Also, it is conceivable that each discharge jet be supplied with pressurized fluid from its own input line, in which case the annulus 50 is not required to supply fluid to the jets. Also, jets may be of a configuration other than cylindrical, and could be formed, for example, by providing a plurality of radially-directed cross bars through an otherwise thin, circular-shaped discharge annulus at the end of tube 18.

Although the invention has been described in terms of the specified embodiments which are set forth in detail, it should be understood that this is by illustration only. This invention is accordingly not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. Apparatus for venting gas from a sealed vessel housing a non-cryogenic liquid/gas mixture in a zero or near zero gravity environment, comprising a vessel having a liquid inlet port:
    gas vent tube means for venting gas from the vessel, the gas vent tube means having a central axis, an inlet opening within the vessel, and an outlet opening outside the vessel;
    liquid input tube means passing through the liquid input port, and radially enclosing at least a portion of the gas vent tube means adjacent the inlet opening, for passing pressurized non-cryogenic liquid into the vessel through an annulus between the liquid input tube means and the portion of the gas vent tube means adjacent the inlet opening, the liquid input tube means having a central axis and a discharge end within the vessel;

a plurality of discharge jets circumferentially positioned about the discharge end of the liquid input tube means for discharging pressurized liquid from the liquid input tube into the vessel, each discharge jet having a jet axis for directing a liquid jetstream to intersect jetstreams from other of the plurality of discharge jets at a position axially downstream from the discharge end of the liquid input tube means, such that the plurality of discharge jetstreams form a conical-shaped liquid barrier having its base adjacent the inlet opening of the gas vent tube means, thereby allowing only substantially gas to pass through the barrier and from the vessel through the gas vent tube.

2. Apparatus as defined in claim 1, wherein:
the plurality of jets are arranged in a plurality of circular configurations each having its axis aligned with the central axis of the gas vent tube means; and
the angular spacing of the discharge jets of one of the circumferential configurations is offset with respect to the angular spacing of the discharge jets of another of the circumferential configurations.

3. Apparatus as defined in claim 1, wherein each of the plurality of discharge jets has a substantially cylindrical configuration with a diameter more than one-third the centerline spacing between adjacent jets.

4. Apparatus as defined in claim 1, further comprising:
a gas pressurizing source for selectively forcing fluid from the gas vent tube into the vessel.

5. Apparatus as defined in claim 1, further comprising:
a sharp edge flow obstruction arranged circumferentially about an exterior surface of the liquid input tube means and adjacent the discharge end of the liquid input tube.

6. Apparatus as defined in claim 1, wherein the central axis of the gas vent tube means and the liquid input tube means are substantially aligned.

7. Apparatus as defined in claim 6, wherein the jet axis of each of the plurality of discharge jets passes substantially through the central axis of the gas vent tube means.

8. Apparatus as defined in claim 6, wherein:
the jets are uniformly arranged about the discharge end of the liquid input tube means and are positioned radially outward from the inlet opening of the gas vent tube means; and
the spacing between adjacent jets is preselected as a function of the selected permissible size of liquid in vented gas allowed to pass out of the storage vessel through the gas vent tube means.

9. Apparatus as defined in claim 1, further comprising:
the vessel having a liquid outlet port;
a liquid collection device within the vessel for collecting substantially liquid adjacent the liquid outlet port;
a flow line for interconnecting the liquid outlet and the liquid input tube means; and
a liquid pump for passing pressurized liquid in the flow line to the plurality of discharge jets.

10. Apparatus as defined in claim 9, further comprising:
sensor means for detecting the flow of liquid to the discharge jets and generating a flow signal in response thereto; and
a valve along the gas vent tube means for selectively opening in response to the flow signal from the sensor means.

11. A method of venting substantially only gas from a vessel having a liquid/gas mixture in a zero or near zero gravity environment, the vessel having a liquid input port, the method comprising:
forming a gas flow path through a wall of the vessel, the gas flow path having an inlet opening within the vessel and an outlet opening outside the vessel;
positioning a plurality of discharge jets circumferentially about the gas inlet opening, each of the discharge jets having a jet axis directed toward the jet axes of other of the plurality of jets;
passing pressurized liquid through the liquid input port and to each of the plurality of discharge jets to form a liquid jetstream from each of the jets, the plurality of jetstreams forming a conical-shaped liquid barrier having its base adjacent the inlet opening of the gas flow path; and
opening the gas flow path to permit venting of gas from the vessel while liquid is substantially prevented from passing to the gas flow path by the conical-shaped liquid barrier.

12. A method as defined in claim 11, further comprising:
spacing the distance between adjacent jets as a function of the selected permissible size of liquid droplets allowed to pass between the jetstreams and along the gas flow path out the vessel.

13. A method as defined in claim 11, further comprising:
positioning a first plurality of the discharge jets in a first circular configuration having a first diameter;
positioning a second plurality of the discharge jets in a second circular configuration having a second diameter; and
arranging the angular spacing of the discharge jets in the first configuration such that each of the discharge jets in the second configuration is offset with respect to the discharge jets in the first configuration.

14. A method as defined in claim 11, wherein the step of passing pressurized liquid comprises:
providing a flow line between a liquid output port and liquid input port;
removing substantially liquid from the vessel through the liquid output port; and
pressurizing liquid passing through the liquid flow line and to the plurality of discharge jets.

15. A method as defined in claim 11, further comprising:
intermittently passing a pressurized gas through the gas flow path for forcing fluid in the gas flow path into the vessel.

16. A method as defined in claim 11, wherein:
the gas flow path is formed by providing an gas vent tube passing through a wall of the vessel and having an inlet opening within the vessel; and
pressurized liquid is passed through the liquid input port and to each of the plurality of discharge jets through a liquid input tube radially enclosing at least a portion of the gas vent tube adjacent the inlet opening.

17. A method as defined in claim 16, wherein:
each of the gas vent tube and the liquid input tube has a central axis; and
the axes of the gas vent tube and liquid input tube are substantially aligned.

18. A method as defined in claim 16, wherein each of the jet axes are directed substantially through the central axis of the gas vent tube.

19. A method of venting gas from a sealed vessel housing a liquid/gas mixture in a substantially zero gravity environment while supplying pressurized liquid to the vessel through a liquid input port, the method comprising:
forming a gas flow path through a wall of the vessel, the gas flow path having a gas inlet opening within the vessel and a gas outlet opening outside the vessel;
positioning a plurality of discharge jets circumferentially about the gas inlet opening, each of the discharge jets having a jet axis directed toward the jet axes of other of the plurality of jets;
passing the pressurized liquid from the liquid input port to each of the plurality of discharge jets to form a liquid jetstream from each of the jets, the plurality of jetstreams forming a conical-shaped liquid barrier having its base adjacent the inlet opening of the gas flow path;
passing a pressurizing gas through the gas flow path for forcing fluid in the gas flow path into the vessel; and
thereafter opening the gas flow path while continuing to pass pressurized liquid to each of the plurality of discharge jets to permit venting of gas from the vessel while liquid is substantially prevented from passing to the gas flow path by the conical-shaped liquid barrier.

20. The method as defined in claim 19, wherein pressurized liquid is supplied to the liquid input port by:
providing a flow line between a liquid output port and liquid input port;
removing substantially liquid from the vessel through the liquid output port; and
pressurizing liquid passing through the liquid flow line and to the liquid input port.

* * * * *